UNITED STATES PATENT OFFICE.

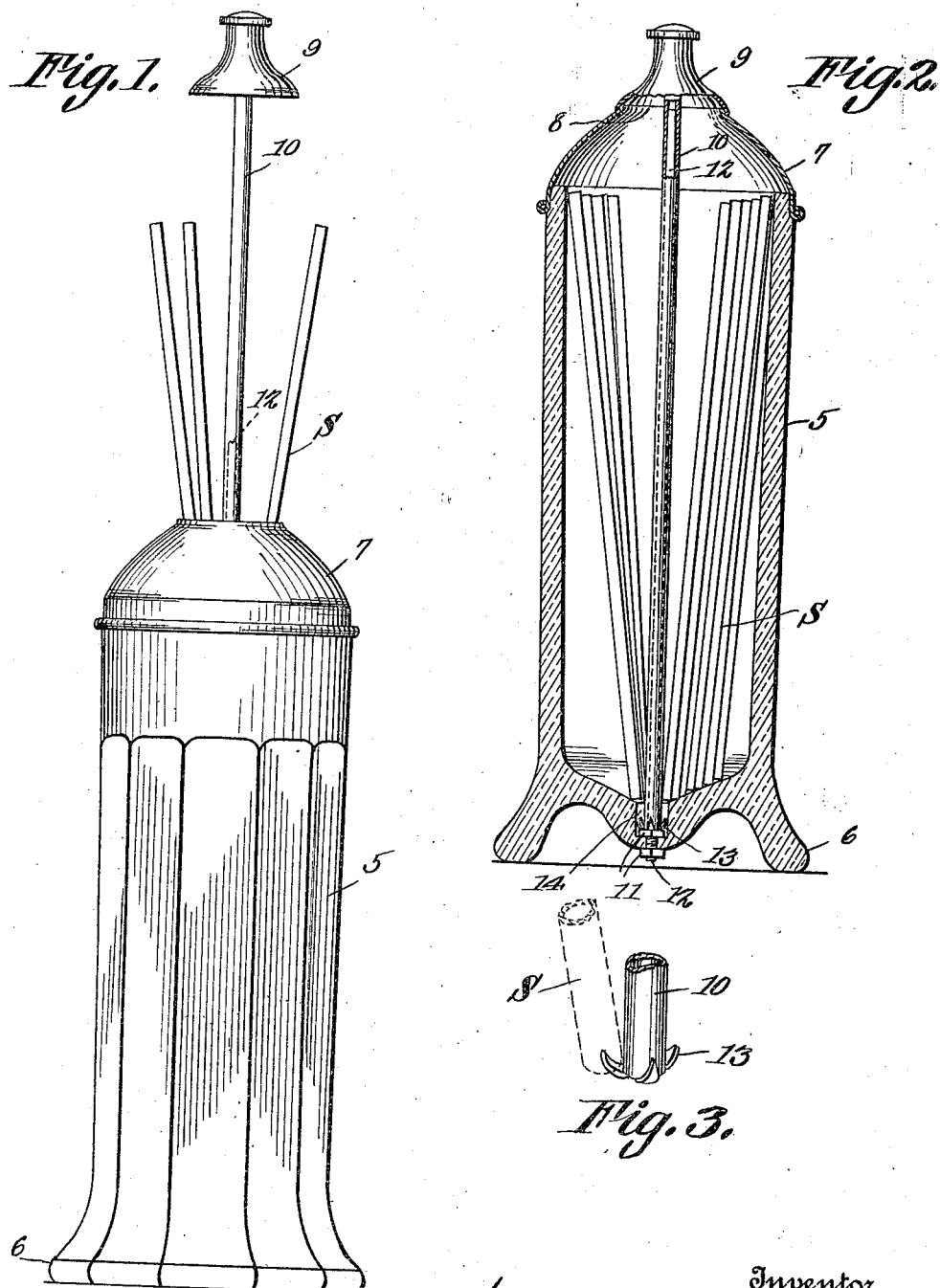

WILLIAM J. EISENHARDT, OF BALTIMORE, MARYLAND.

STRAW-DISPENSER.

1,276,338.
Specification of Letters Patent.
Patented Aug. 20, 1918.

Application filed April 5, 1918. Serial No. 226,880.

*To all whom it may concern:*

Be it known that I, WILLIAM J. EISENHARDT, a citizen of the United States, residing at Baltimore city, State of Maryland, have invented certain new and useful Improvements in Straw-Dispensers, of which the following is a specification.

This invention relates to apparatus for dispensing straws used in drinking soda water and other beverages, and its object is to provide an apparatus of this kind in which the straws are completely housed and thus protected from contamination by being handled or exposed to dust, dirt, etc., and from which apparatus the straws can be removed as needed without the operator's hands coming in contact with the supply.

The invention also has for its object to provide a straw dispensing apparatus in which the delivery device is constructed to discharge more than one straw at a time and also to provide other novel features of construction to be pointed out in the detailed description appearing hereinafter.

In order that the invention may be better understood, reference is had to the accompanying drawing forming a part of this specification, it being understood that while the preferred embodiment of the invention has been shown, various changes and modifications may be resorted to without a departure from the spirit and scope of the invention as claimed hereinafter.

In the drawing, Figure 1 is an elevation of the apparatus showing the delivery of the straws; Fig. 2 is a central vertical section of the apparatus, with the straw delivery device in normal inactive position, and Fig. 3 is a detail in perspective.

Referring specifically to the drawing, 5 denotes a container of proper height to house the straws shown at S. The container has a suitable base 6 so that it may be supported in upright position on a counter, table, or other flat surface. The top of the container is closed by a cap 7 which is removable in order that the supply of straws may be placed in the container and replenished when used up. The cap 7 tapers upwardly, and at the top is a central opening 8 which is closed by a cap-like knob 9 seating over the same, said knob being on the upper end of a lifter sleeve 10 to be presently described.

In the bottom of the container 5 is a central aperture in which is secured, by lock nuts 11, a rod or stem 12 which extends upward in the container, with its upper end terminating at or near the opening 8. This stem is stationary, and its function is to guide the lifter sleeve 10, the latter being tubular and telescopically or slidably mounted on the stem.

On the bottom of the lifter sleeve 10 are outstanding prongs 13 which are turned slightly upward, as shown in Figs. 2 and 3.

The bottom of the container 5, on the inside thereof, is made sloping toward a central recess 14 in said bottom, said recess being dimensioned to seat the prongs 13.

As shown in Fig. 2, the lifter sleeve 10 is of such length that when it is pushed down as far as it will go, its pronged lower end seats in the recess 14 on the top lock nut 11, and the cap 9 is now seating over the opening 8, so that the container is completely closed to protect the straws S from being contaminated from being handled or being exposed to dust, dirt, etc. The straws are positioned upstanding in the container around the sleeve 10, with their lower ends resting on the sloping container bottom, in view of which it will be seen that they have a normal tendency to slip toward the center of the container bottom. The straws nearest the center have their lower ends positioned above the prongs 13 seating in the recess 14, and hence, when the sleeve 10 is withdrawn from the container, the prongs seize the straws at their lower ends and lift the same in the container, so that they issue from the opening 8, as shown in Fig. 1, where they may be grasped for complete removal from the container.

The lifter sleeve 10 is grasped by the cap 9, and upon being dropped back after the projected straws have been removed, the cap again closes the opening 8, and the lower end of the lifter sleeve is again seated in the recess 14 and ready for the next ejecting operation. As the cap 7 is crowned, the upper ends of the straws, as they are being elevated, are guided toward the exit opening 8.

The container may be made of glass or any other material, and it can be given any desired size, shape and ornamental appearance.

I claim:

1. A straw dispensing apparatus comprising a container having a straw exit opening, a guide stem in the container extending from the bottom thereof in the direction of the exit opening, said bottom sloping toward the stem, and a straw ejector slidably mounted on the guide stem and having means at its inner end engageable with the straws, the container bottom being recessed to seat said means.

2. A straw dispensing apparatus comprising a container having a removable cover provided with a central straw exit opening, and a straw ejector operating through said opening and movable in the direction thereof, for ejecting straws through said opening, the ejector being spaced laterally from the wall of the opening a distance to permit the straws to pass therethrough alongside the ejector.

3. A straw dispensing apparatus comprising a container having a removable cover provided with a central straw exit opening, a straw ejector operating through said central opening and movable in the direction thereof for ejecting straws through said opening, and a closure for the opening carried by the ejector.

In testimony whereof I affix my signature in presence of two witnesses.

WILLIAM J. EISENHARDT.

Witnesses:
E. WALTON BREWINGTON,
HOWARD D. ADAMS.

Copies of this patent may be obtained for five cents each, by addressing the "Commissioner of Patents, Washington, D. C."